United States Patent
Stenvall

(10) Patent No.: US 6,378,881 B2
(45) Date of Patent: Apr. 30, 2002

(54) WHEEL SUSPENSION FOR A VEHICLE

(75) Inventor: Lars Stenvall, Ljungskile (SE)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/681,675

(22) Filed: May 18, 2001

(51) Int. Cl.[7] .............................................. B60G 3/10
(52) U.S. Cl. ............................................. 280/124.171
(58) Field of Search ...................... 280/124.163, 124.17, 280/124.171, 124.175; 267/242, 269, 36.1, 233, 234, 243, 229

(56) References Cited

U.S. PATENT DOCUMENTS

| | | | |
|---|---|---|---|
| 3,491,994 A | | 1/1970 | Reynolds et al. |
| 4,982,978 A | * | 1/1991 | Kawasaki ............ 280/124.109 |
| 5,007,660 A | | 4/1991 | Orndorff, Jr. et al. |
| 5,024,462 A | * | 6/1991 | Assh ......................... 267/241 |
| 5,271,638 A | * | 12/1993 | Yale ..................... 280/124.102 |
| 5,873,581 A | * | 2/1999 | Yale ..................... 280/124.163 |
| 6,019,384 A | * | 2/2000 | Finck .......................... 267/260 |

FOREIGN PATENT DOCUMENTS

| | | | | |
|---|---|---|---|---|
| EP | 0965467 A2 | 12/1999 | | |
| GB | 855805 A | 3/1998 | | |
| JP | 58199208 A | * | 11/1983 | ............ B60G/11/02 |
| JP | 04087814 A | * | 3/1992 | ............ B60G/7/04 |
| WO | WO 9102908 A1 | 3/1991 | | |

* cited by examiner

*Primary Examiner*—Paul N. Dickson
*Assistant Examiner*—Faye M. Fleming
(74) *Attorney, Agent, or Firm*—Kilpatrick Stockton LLP

(57) ABSTRACT

Wheel suspension for a vehicle, comprising a transverse spring, and, on the respective right and left side of the vehicle, a mounted upper deflection limiting device that is provided with an engaging device for engaging the spring. The spring is suspended in spring seats, each comprising a lever. The invention lever has a central suspension section in which the lever is pivotable relative to the vehicle around a suspension axis arranged in a substantially longitudinal direction of the vehicle; an inner end section placed below and, in relation to the longitudinal plane, inside the central suspension section, wherein the inner end section is provided with a supporting element that is in contact with the spring at the inner attachment point, which supporting element is slidable along the spring in the transverse direction of the vehicle as a function of the rotation of the lever around the suspension axis; and an outer end section placed outside the central suspension section, whereby the spring contacts the engaging device of the deflection limiting device, and an actuating device connected to the engaging device is arranged to mechanically act on the outer end section in such a way that the lever is pivoted around the suspension axis, whereby the supporting element, as well as the said inner attachment point, are displaced downwards and outwards towards the outer attachment point of the spring.

17 Claims, 18 Drawing Sheets

WHEEL SUSPENSION FOR A VEHICLE

BACKGROUND OF INVENTION

1. Technical Field

The invention relates to a wheel suspension for a vehicle comprising a transverse spring means, such as a leaf spring, in the longitudinal direction of the vehicle. The wheel suspension may be used advantageously both for front and rear suspensions.

2. Background Art

Modern wheel suspensions tend to become more and more complicated as demands increase for a comfortable ride and safe performance. Many known types of wheel suspensions are of the so-called multi-link type, which comprise a number of mutually connected pivotable linkages. By using an ingenious design of these linkages, it is possible to achieve an almost optimum compromise between, e.g., ride comfort and performance (such as cornering, rolling etc.) in accordance with the desired character of the vehicle. A disadvantage of this type of multi-link suspension is that the number of components, as well as the number of moving parts, are high, leading to higher costs that can only be justified for more expensive vehicles. The relatively large number of moving parts, such as ball joints, will eventually also entail higher maintenance costs due to wear.

For less expensive vehicles, it is therefore desirable to provide a wheel suspension having a simpler design, having as few moving parts as possible and manufactured at a lower cost while still fulfilling the requirements of ride comfort and performance necessary for this type of vehicle.

A problem with the simple wheel suspensions described above is that the limited cost margin and degree of complexity makes it difficult to achieve acceptable characteristics in view of roll damping and roll rigidity. For example, it is desirable to achieve a progressively stiffer suspension as the load on the vehicle increases.

A further problem with known wheel suspensions, such as the currently dominating so-called McPherson-type, is the use of bulky suspension struts with coiled springs that extend into the engine compartment, luggage compartment or passenger space of the vehicle, taking up valuable space that could be better utilized. The engine compartment in modern cars is often reduced by design limitations, which, together with increasing demand for engine performance, makes it desirable to maximize use of the available space for the engine and its peripheral equipment. With respect to the luggage compartment, the need for a low and level loading surface without extending struts is obvious.

A further problem with the known type of extending suspension struts is that their rigidity and upright position in the engine compartment present a potentially increased risk of injury to the body of a pedestrian, should a frontal collision occur in which the pedestrian strikes the hood of the vehicle. The hood itself, as well as other parts of the vehicle body, has been specially designed to absorb the energy of the collision by means of controlled deformation. At moderate speeds this results in a relatively gentle deceleration of the body of the pedestrian, as compared to the body of the pedestrian striking the relatively rigid suspension struts after an initial deformation of the hood. For this reason it is desirable to eliminate struts of this type from the engine compartment.

An early example of a simple wheel suspension using a transverse leaf spring is described in British Patent GB 264 074, published in 1926. Apart from being of a type that is unsuitable for modern vehicles for reasons of road-holding, this wheel suspension lacks roll inhibiting properties and progressively increasing roll rigidity.

A further example of a simple wheel suspension having a transverse leaf spring is taught in French Patent FR 2 632 573. This wheel suspension also lacks roll inhibiting properties and progressively increasing roll rigidity.

Finally, European Patent EP 0 195 536 discloses a simple wheel suspension having a transverse leaf spring, in which the ground clearance of the vehicle may be adjusted by manipulating one of the seats of the spring. However, progressively increasing roll rigidity can not be achieved.

SUMMARY OF INVENTION

The present invention solves the above problem by providing a wheel suspension for a vehicle having longitudinally a leaf spring or transverse spring means. This transverse spring means has a first end section positioned at the left half of the vehicle relative to a vertical longitudinal plane through the center of the vehicle, and a second end section positioned at the right half of the vehicle. Each end section is attached, either directly or indirectly, to a wheel carrier carrying the left and right wheels of the vehicle respectively at an outer attachment point relative to the longitudinal plane. The spring means is attached to the vehicle via a spring seat at an inner attachment point on either side of the plane. An upper deflection limiting device having a damper or engaging means for engaging said spring means is attached to the left and right half of the vehicle, respectively.

A particular feature of the invention is that the spring seats each comprise a lever that has a central suspension section with the lever pivotable relative to the vehicle around a suspension axis arranged in a substantially longitudinal direction of the vehicle. An inner end section is placed below and, in relation to the longitudinal plane, inside the central suspension section. At the inner attachment point the inner end section is provided with a supporting element that is in contact with the spring means. The supporting element is slidable along the spring means in the transverse direction of the vehicle as a function of the rotation of the lever around the suspension axis. An outer end section is placed outside the central suspension section. When the spring means contacts the engaging means of the deflection limiting device, an actuating device connected to the engaging means is arranged to mechanically act on the outer end section in such a way that the lever is rotated around the suspension axis, whereby the supporting element and the inner attachment point are displaced downwards and outwards towards the outer attachment point of the spring means.

According to a preferred embodiment of the invention, the outer end section is provided with an actuation surface arranged for contacting the actuating means.

Furthermore, the actuating means is preferably placed immediately adjacent the engaging means.

According to a further embodiment the spring means comprises a leaf spring.

According to an advantageous embodiment, the engaging means comprises a first liquid- or gas-filled hydraulic chamber that communicates with a second hydraulic chamber in the actuating means through a first conduit. The engaging means further comprises a first liquid- or gas-filled hydraulic chamber that communicates with a second hydraulic chamber, arranged in the actuating means, through a first conduit. The first hydraulic chamber preferably comprises an elastically compressible bladder, while the second hydraulic chamber preferably comprises an elastically expandable bladder.

Also, according to a preferable embodiment of the invention, a second intermediate conduit connects the first and second hydraulic chambers, wherein this second conduit is provided with a non-return valve preventing liquid or gas from flowing from the second hydraulic chamber to the first hydraulic chamber.

In a first alternative embodiment of the invention the actuating means comprises a hydraulic piston arranged to cooperate with the hydraulic chamber.

In a second alternative embodiment of the invention the engaging means comprises a hydraulic piston, while the actuating means comprises a liquid- or gas-filled hydraulic chamber in the form of an elastically expandable bladder arranged to cooperate with the hydraulic piston.

In a third alternative embodiment of the invention the engaging means comprises a first hydraulic piston, while the actuating means comprises a second hydraulic piston arranged to co-operate with the first hydraulic piston.

In a fourth alternative embodiment of the invention the engaging means is rigidly connected to the actuating means. The engaging means is spring loaded in a downward direction by means of a compressive spring, while the actuating means is spring loaded in an upward direction by means of a compressive spring.

In summary, the present invention offers a simple and cost-effective wheel suspension having a number of advantageous properties, such as automatic level control for a vehicle with a heavy load, automatic adjustment of the spring coefficient, and automatic control of the rolling rigidity.

BRIEF DESCRIPTION OF DRAWINGS

In the following text, the invention will be described in detail with reference to the attached drawings, in which.

DETAILED DESCRIPTION

Figure 1:
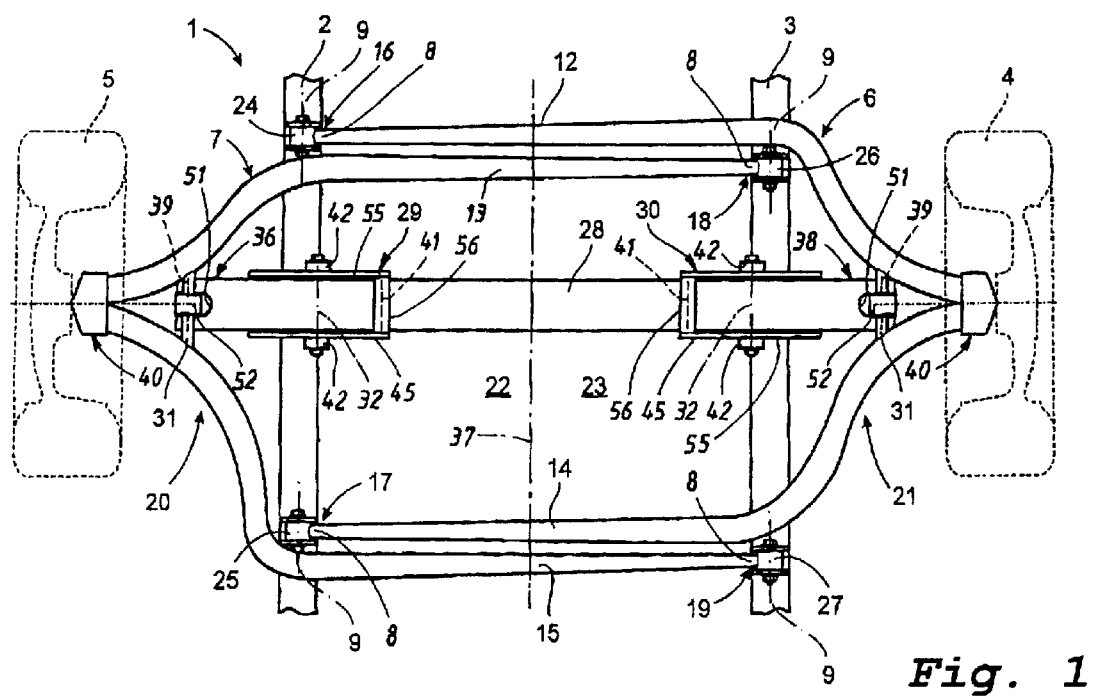
FIG. 1 illustrates a bottom plane wheel suspension according to a first embodiment of the invention.

In FIG. 1 the reference numeral 1 generally denotes a wheel suspension for a vehicle according to an advantageous embodiment of the invention. In the figure, the wheel suspension 1 is mounted on load-bearing beams 2, 3, which are part of the chassis of the vehicle. For reasons of clarity, the remaining vehicle has been excluded. The beams 2, 3 can, as illustrated, be part of a conventional frame of a vehicle having rectangular frame sections. However, they can also be a part of a more complex chassis structure (not shown) of a composite type, wherein the beams 2, 3 may have any cross-section. Hence, the beams 2, 3 may be designed to be integrated in, for example, a so-called platform having a sandwich construction. The wheel suspension 1 may advantageously be used as both a front wheel and rear wheel suspension.

Figure 2:
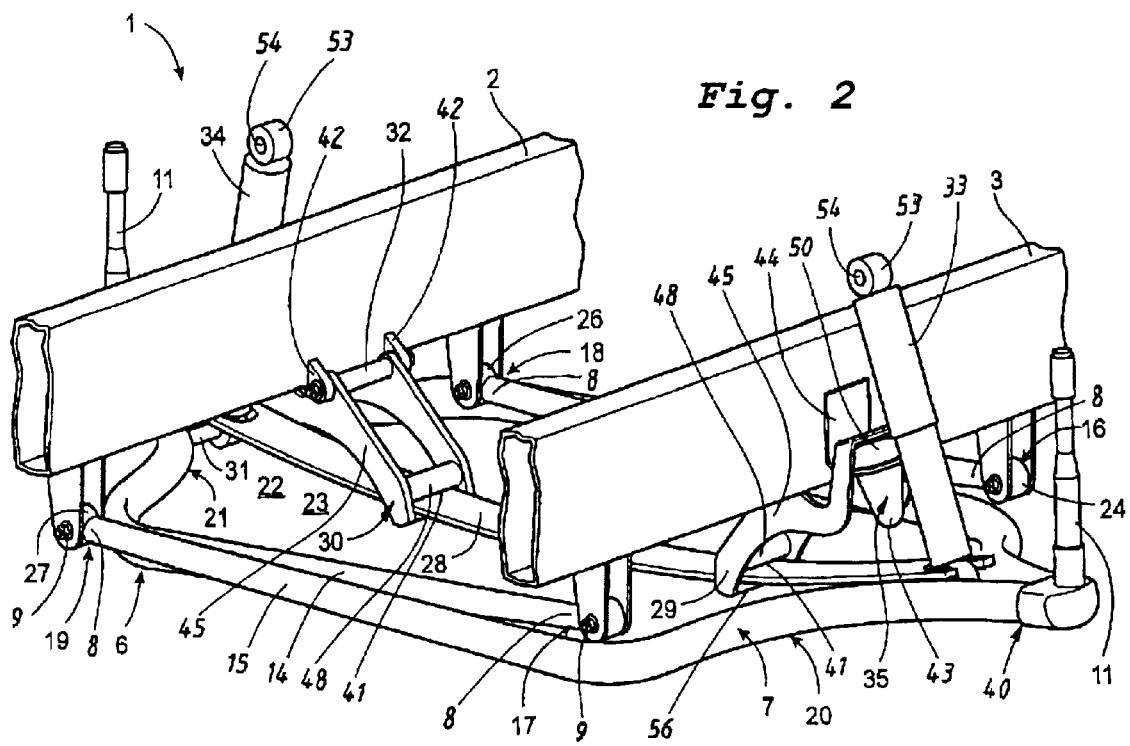
FIG. 2 illustrates a top perspective view of the wheel suspension according to the embodiment of FIG. 1.

Referring to FIG. 1, a right wheel 4 and a left wheel 5 are each carried by a substantially U-shaped, single linkage 6, 7. Note that the normal forward direction of travel of the vehicle is directed downwards in FIG. 1, and that the wheel suspension 1 is viewed from below. In FIG. 2 it is viewed from an oblique angle from the front and above. Furthermore, the wheels 4, 5 are drawn using dotted lines in FIG. 1, as to avoid concealing parts of the wheel suspension 1.

The linkages 6, 7 are pivotably journaled in the beams 2, 3 respectively, on the opposite side of the vehicle in relation to their respective wheels. The linkages 6, 7 are journaled on axes 9, which are parallel to the longitudinal direction of the vehicle, i.e., in the vertical direction in FIG. 1. Hence, the linkage 6 of the right wheel 4 is journaled in the beam 3 on the left half of the vehicle, the linkage 7 of the left wheel 5 is journaled in the beam 2 on the right half of the vehicle. Also, in a wheel attachment part 40 the linkages 6, 7 are connected to their respective wheels 4, 5 via a wheel spindle 11.

Each linkage 6, 7 is provided with two substantially parallel legs 12, 13, 14, 15, extending in the transverse direction of the vehicle. The free ends 16, 17, 18, 19 of the legs 12, 13, 14, 15 make up the first end section 8. The linkages 6, 7 are further provided with closed sections 20, 21 connecting the legs, thereby defining an open space 22, 23 between the legs 12, 13, 14, 15 of each linkage 6, 7. In the embodiment shown, one leg 13, 14 of each linkage 6, 7 extends into the open space 22, 23 between the legs 12, 13, 14, 15 of the other linkage 6, 7.

The legs 12, 14 of one of the linkages 6 is provided with attachment points 24, 25 on the vehicle. Those points are displaced in the longitudinal direction of the vehicle in relation to the corresponding attachment point 26, 27 for the legs 13, 15 of the other linkage 7. As such, the linkages 6, 7 can be pivoted independently of each other around the axes 9.

Furthermore, as can be seen from FIG. 1 and FIG. 2, the linkages 6, 7 are connected by a single leaf spring 28 in the transverse direction of the vehicle. The leaf spring 28 has a first end section 36 positioned on the left half of the vehicle relative to a vertical longitudinal center plane 37 (shown as a dotted line in FIG. 1), and a second end section 38 positioned on the right half of the vehicle relative to the center plane 37. Each of the end sections 36,38 is connected to the wheel attachment part 40 carrying the left hand and right hand wheels 4, 5, respectively, at an outer attachment point 39 in relation to the center plane 37. In the embodiment shown, the wheel attachment part 40 illustrates the wheel spindle 11 described above.

Figure 3:
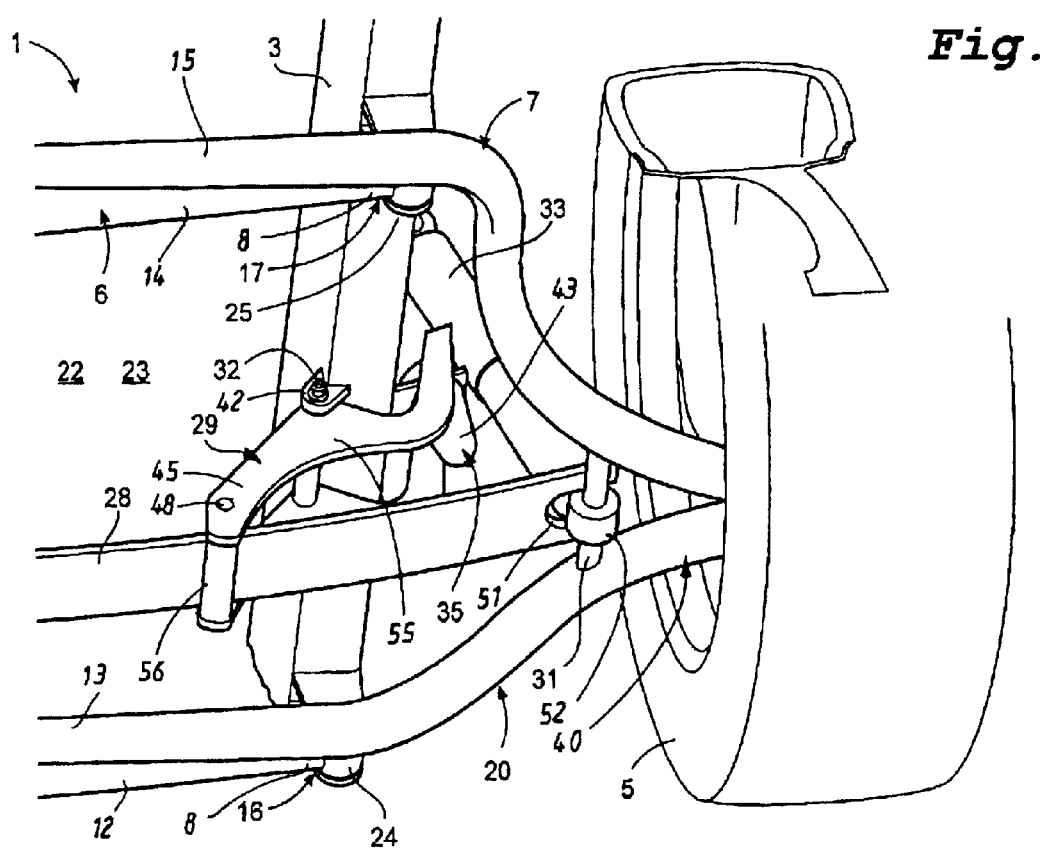
FIG. 3 illustrates an enlarged bottom perspective view of an attachment for a linkage being attached to a wheel at one end.

In the outer attachment point 39 the leaf spring 28 is in contact with a strut 31 on either linkage 6,7, with the strut 31 extending between the legs 12,13,14,15 in the longitudinal direction of the vehicle. The second end section 10 of each linkage 6, 7 is connected to a shock absorber 33, 34, which in turn is connected to the vehicle in a conventional manner (not shown). As clearly seen from FIGS. 3 and 4, the strut 31 has a cylindrical shape. Furthermore, each end section 36, 37 of the leaf spring 28 has an outwardly open, U-shaped cut-out 51. The cut-out 51 is arranged to make room for a lower attachment casing 52 placed around the circular strut 31 at the lower end of the respective shock absorber 33, 34.

Figure 4:
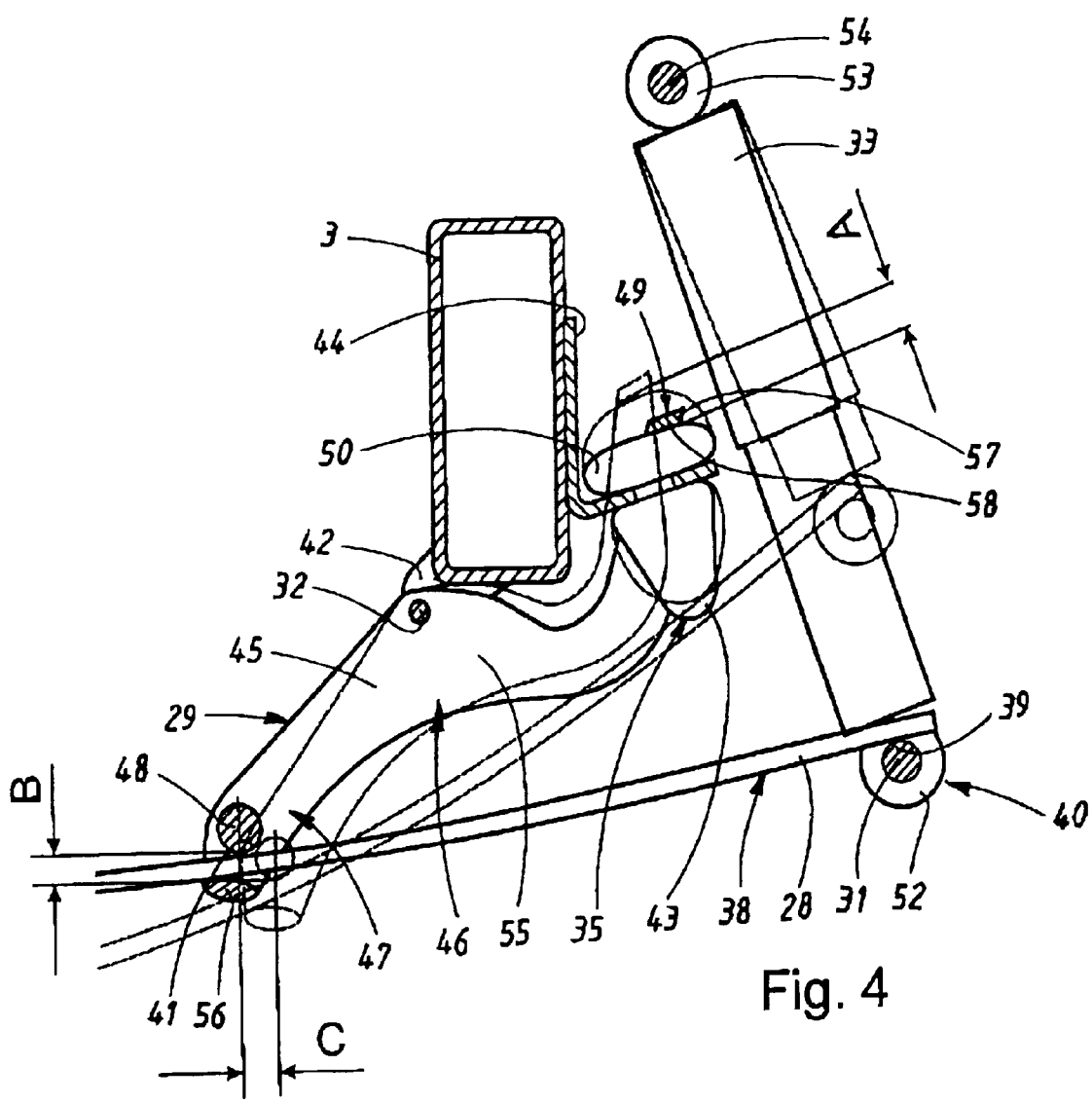
FIG. 4 illustrates an enlarged partial view of the attachment of a spring seat.
Figure 11:
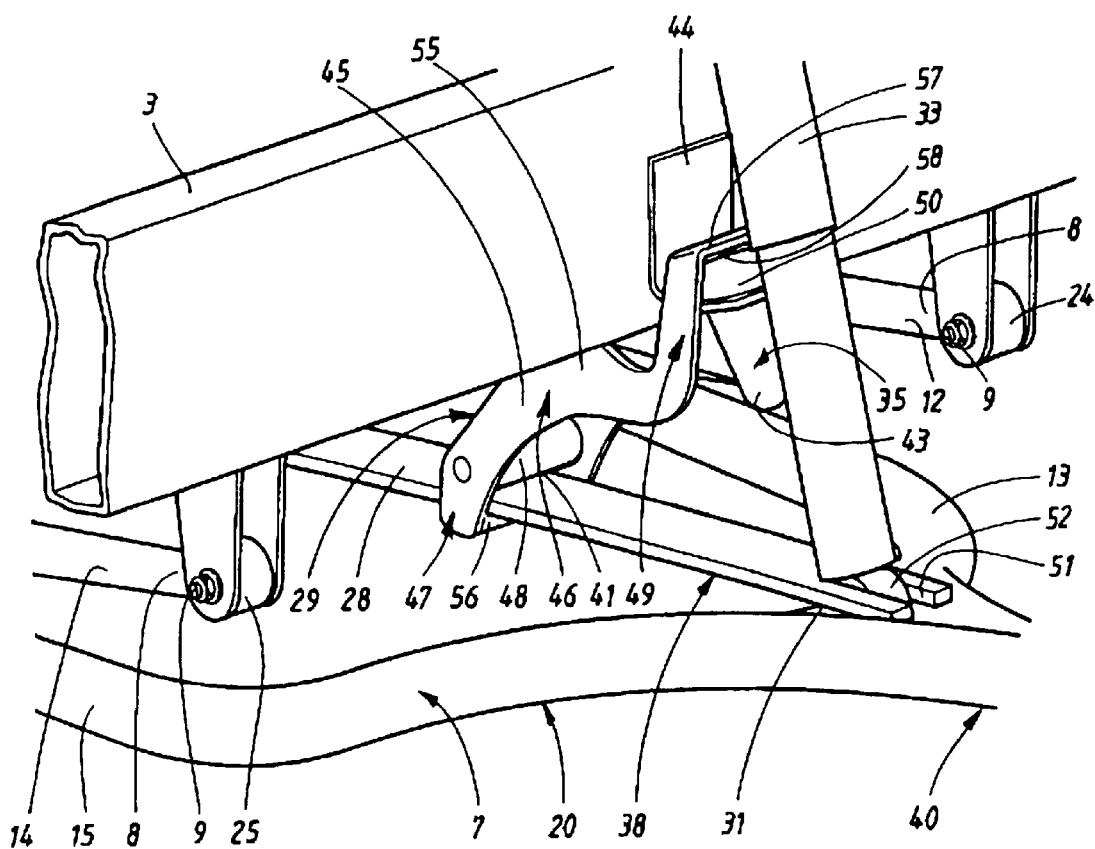
FIG. 11 illustrates an enlarged perspective partial view of a spring seat with the wheel suspension under normal load.
Figure 12:
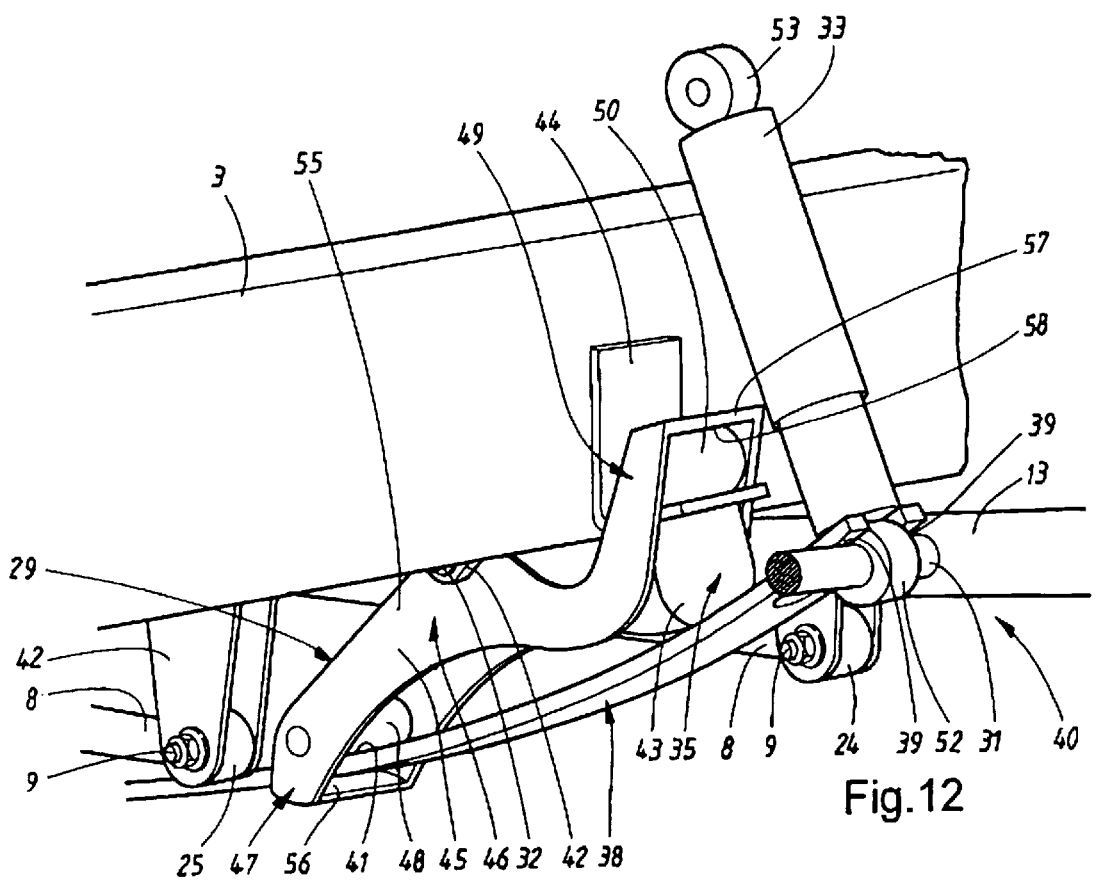
FIG. 12 illustrates an enlarged perspective partial view of a spring seat with the wheel suspension in the extreme upper position.

As can be seen particularly clear from FIG. 4, the shock absorber 33 is attached to the vehicle in a conventional manner using an upper attachment casing 53 mounted on a fixed axis 54 on the vehicle. In FIG. 4 the outer attachment point 39 is shown as a contact point between the strut 31 and the leaf spring 28. However, this apparent contact point extends into the figure. Referring to FIG. 1, the outer attachment point 39 is seen to actually be a contact line (shown as a dotted line in FIG. 1) between the flat leaf spring 28 and the cylindrical strut 31. This is inferred in FIGS. 3, 11 and 12, although the contact line is concealed. However, the contact line is broken at the cutout 51 for the lower attachment casing 52 of the shock absorbers 33, 34.

The leaf spring 28 is also connected to the vehicle in a spring seat 29, 30 at an inner attachment point 41 on either side of the vehicle relative to the center plane 37. Accordingly, a first spring seat 29 is positioned on the left half of the vehicle in relation to the center plane 37, and a second spring seat is positioned on the right side of the vehicle in relation to the center plane 37. The inner attachment point 41 will be described in more detail herein below.

An upper deflection limiting device 35 is attached on the respective left half and right half of the vehicle. This deflection limiting device defines a limit for the upward movement of the wheel suspension 1 on the respective sides of the vehicle. The limit is reached when the wheel suspension reaches an extreme upper position, the position the wheel suspension 1 would assume when subjected to, e.g., a severe jolt from the road surface. The upper deflection limiting device 35 is provided with a damper or engaging means 43 arranged to engage the leaf spring 28. As can be seen from FIG. 2, the upper deflection limiting device 35 is rigidly attached to each respective beam 2, 3 by means of a bracket 44 that is preferably welded or bolted to the beam 2, 3.

Figure 5:
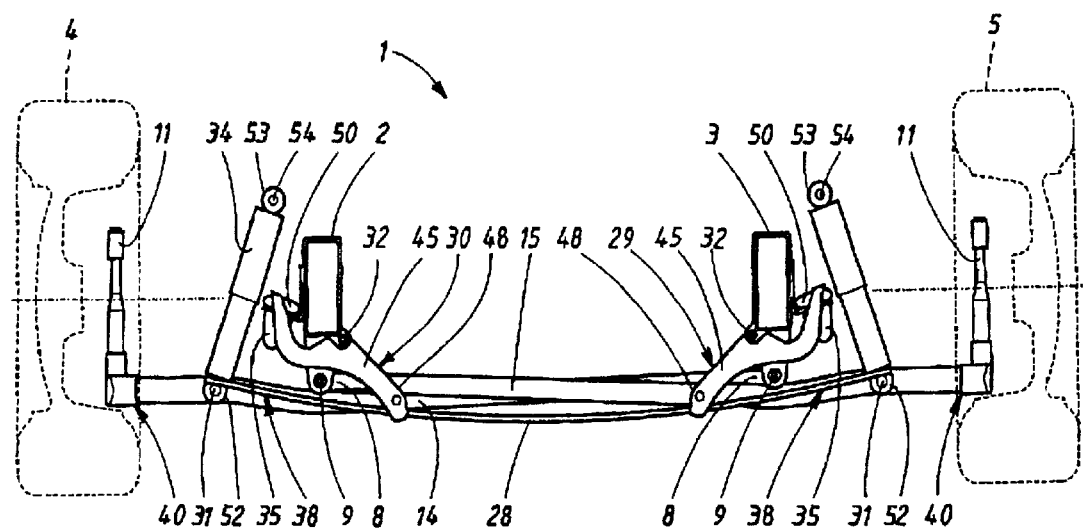
FIG. 5 illustrates a wheel suspension under normal loading, as seen from the front.
Figure 6:
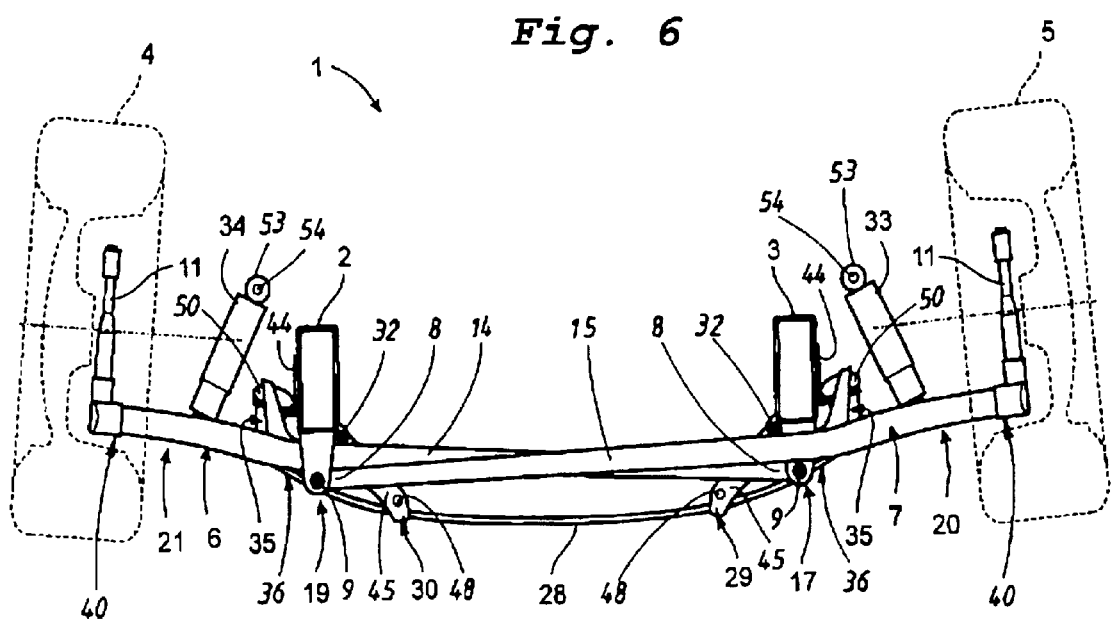
FIG. 6 illustrates a wheel suspension with the wheels at an extreme lower position, equivalent to the vehicle being lifted clear of the ground, as seen from the front.
Figure 7:
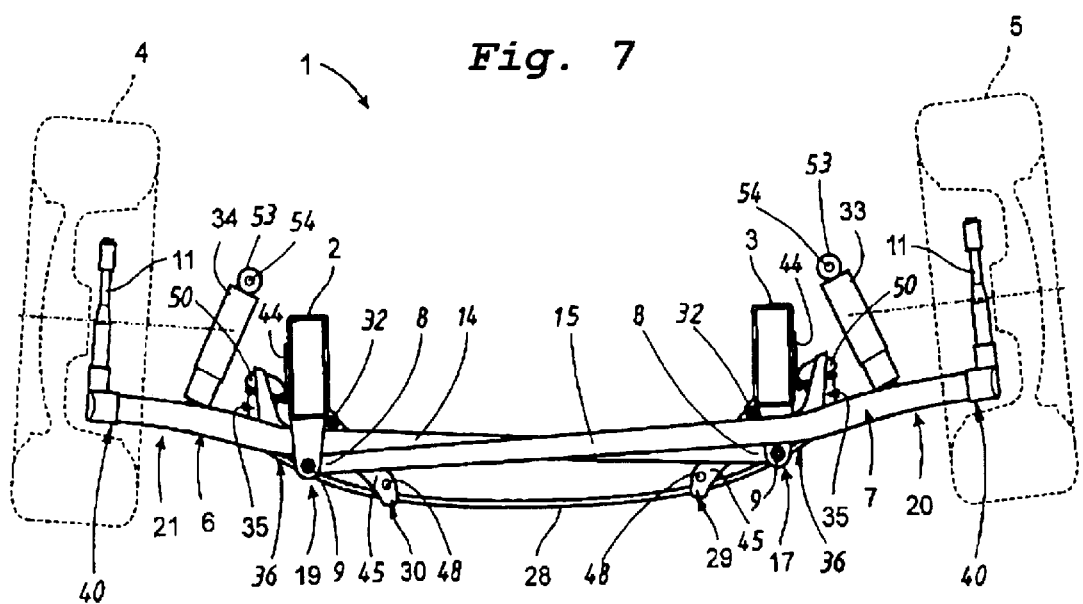
FIG. 7 illustrates a front plane view of a wheel suspension with the wheels at an extreme upper position.
Figure 8:
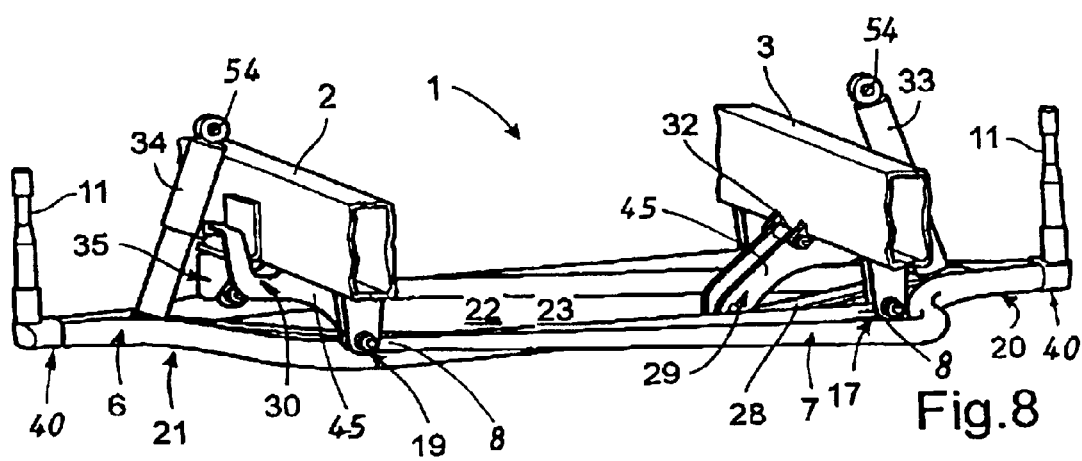
FIG. 8 illustrates a front perspective view of the wheel suspension in the normal loading position of FIG. 5.
Figure 9:
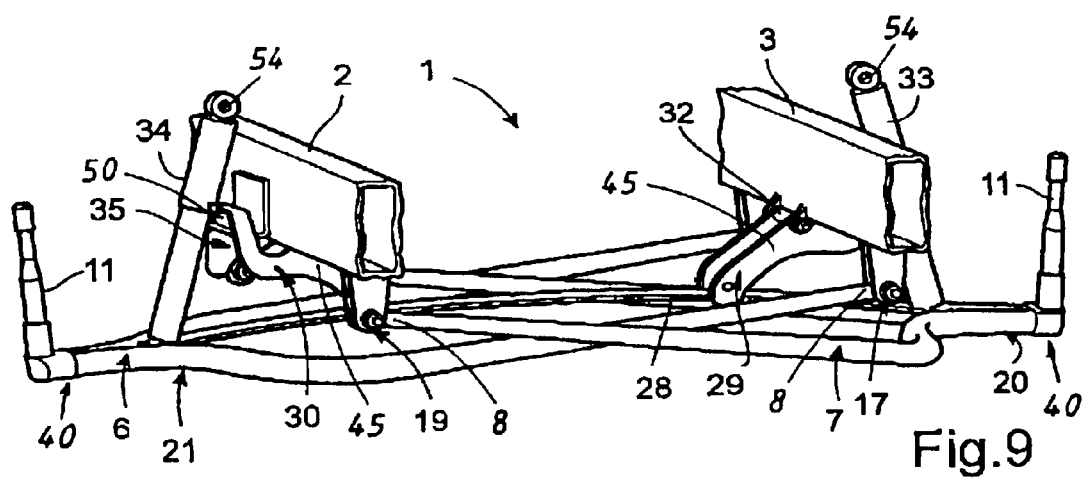
FIG. 9 illustrates a front perspective view of the wheel suspension in the extreme lower position of FIG. 6.
Figure 10:
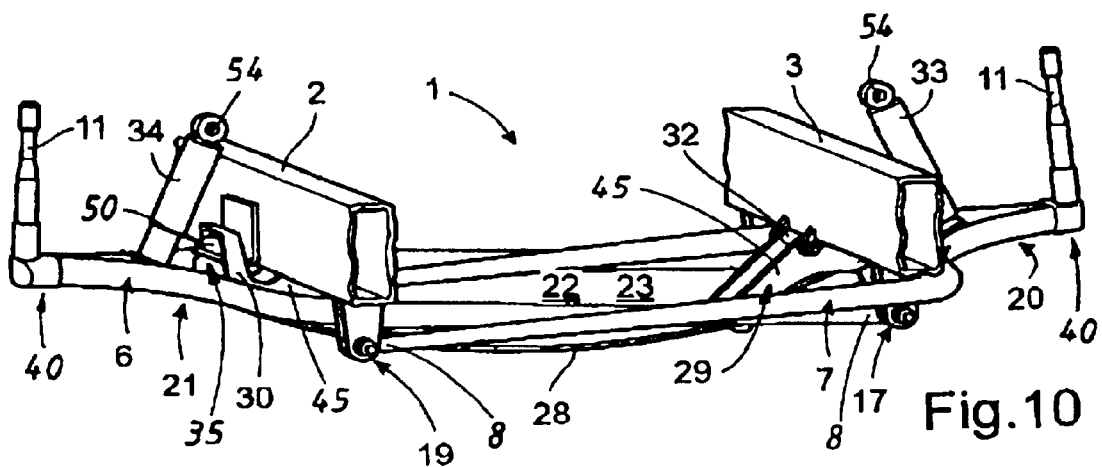
FIG. 10 illustrates a front perspective view of the wheel suspension in the extreme upper position of FIG. 7.

In order to illustrate the movements of the wheel suspension 1, FIGS. 5–10 illustrates a number of loading conditions. FIG. 5 illustrates a front view of the wheel suspension 1 under normal loading conditions wherein the leaf spring 28 is bent slightly upwards and positioned at a distance from the engaging means 43 of both the upper deflection limiting devices 35. FIG. 6 illustrates a front view of the wheel suspension in an extreme lower position wherein the leaf spring 28 is bent significantly downwards and is positioned at a distance from the engaging means 43 of both the upper deflection limiting devices 35. FIG. 7 illustrates a front view of the wheel suspension in an extreme upper position wherein the leaf spring 28 is bent significantly upwards and has contacted the engaging means 43 of the upper deflection limiting devices 35. FIGS. 8–10 illustrates front perspective views of the above positions, wherein FIG. 8 illustrates the wheel suspension 1 in a normal load position, FIG. 9 illustrates the wheel suspension in its extreme lower position and FIG. 10 illustrates the wheel suspension in its extreme upper position.

In addition, FIG. 4 clearly illustrates that the above mentioned spring seats 29, 30 comprise a substantially S-shaped lever 45 having a central suspension section 46. The central suspension section 46 of the lever 45 is pivotably journaled around a suspension axis 32 on the vehicle, with the axis arranged in the longitudinal direction of the vehicle. The suspension axis 32 is rigidly connected to the respective beams 2, 3 by means of attachment flanges 42. As can be seen from the figures, particularly FIGS. 1 and 12, the lever 45 has two vertically extending plates 55 which are connected to each other. These plates 55 are substantially flat and extend in parallel at a mutual distance substantially corresponding to the width of the leaf spring 28. In an alternative (not shown) embodiment, the lever 45 may comprise a single plate 55 that extends along one side of the leaf spring 28.

The lever is further provided with an inner end section 47, positioned below and, relative to the vertical longitudinal center plane 37, inside the central suspension section. The inner end section 47 is provided with a supporting element 48 that is in contact with the leaf spring 28 in the inner attachment point 41. The supporting element 48 is displaceable along the leaf spring 28 in the transverse direction of the vehicle as a function of the rotation of the lever 45 around the suspension axis 32. The supporting element 48 has a cylindrical shape, whereby it is in contact with the leaf spring 28 along a line that forms the inner attachment point 41 (shown as a dotted line in FIG. 1). It must be realized that the supporting element 48 need not necessarily be cylindrical, as other geometrical shapes can be used. The contact line preferably extends across the entire width of the leaf spring 28 as illustrated. The two plates 55 of the lever 45 are connected at the inner end section 47 of the lever. This connection is formed partly by the supporting element 48 and partly by a connecting element 56 arranged immediately below the leaf spring 28. The connecting element 56 also acts as a retaining means for the leaf spring 28 during assembly of the wheel suspension 1. The shape of the connecting element 56 is clear from FIG. 3 and FIG. 4, where it is displayed as an upwardly convex cross-section in order to accommodate the leaf spring 28 in its different extreme positions.

The lever 45 further discloses an outer end section 49 positioned outside the central suspension section 46. When the leaf spring 28 contacts the engaging means 43 of the deflection limiting means 35, the outer end section 49 is arranged to be mechanically actuated by an actuating means 50 connected to the engaging means 43 in such a way that the lever 45 is pivoted around the suspension axis 32.

As seen from FIG. 4, a displacement of the actuating means 50 of the lever 45 by a distance A, results in a downward displacement distance B of the supporting element 48, and, thus the inner attachment point 41, which contacts the leaf spring 28 at the inner end section 47, as well as a displacement distance C outwardly towards the outer attachment point 39 of the leaf spring 28. This means that the distance between the inner attachment point 41 and the outer attachment point 39 is reduced by distance A, as in FIG. 4. Thereby the spring coefficient of the leaf spring 28 increases along the part of the leaf spring that extends between the supporting element 48 of the spring seat 29, 30 and the attachment point of the shock absorber 33, 34 at the strut 31. Hence the stiffness of the leaf spring 28 increases with increased load through automatic adjustment of the spring coefficient, which is a desirable property of a functional wheel suspension.

Downward displacement of the supporting element 48 distance B will also raise the vehicle, either on both the right- and left-hand side due to heavy loading of the vehicle, or one side during a roll movement caused by aggressive cornering. As such, the invention offers an effective automatic level adjustment in the opposite direction of the sprung movement under a heavy load, in addition to the stiffening of the suspension. The downward and outward movement of the supporting element 48 will thus raise the vehicle and stiffen the suspension as required by the loading conditions. Additionally, this is achieved without requiring external manipulation or control.

The outer end section 49 of the lever 45 is provided with a connecting element 57 that connects the plates 55 of the lever 45. The connecting element 57 is also provided with an actuating surface 58 facing mainly downwards toward the actuating means 50 and arranged for contacting the actuating means 50.

The wheel suspension 1 also has a roll inhibiting function through the automatic control of the roll rigidity. This is obtained when a spring seat 29, 30 on one side of the vehicle moves as described above. The anti-rolling effect is achieved by means of the opposite wheel 4, which will also be subjected to a certain upward force component when the first wheel 5 is sprung upwards. The upward force component is caused by the supporting element 48 of the moving spring seat 29 on the first wheel 5 forcing the leaf spring 28 downwards. This will in turn cause the supporting element 48 of the other spring seat 30 on the opposite side of the vehicle to act as a lever pivot point for that part of the leaf spring extending between the first spring seat 29 and the end section 36 of the leaf spring 28 on the opposite side of the vehicle. The end section 36 will then force the wheel attachment section 40 on that side upwards. Hence the roll rigidity is also influenced by a spring seat that is movably arranged according to the invention.

Figure 13:
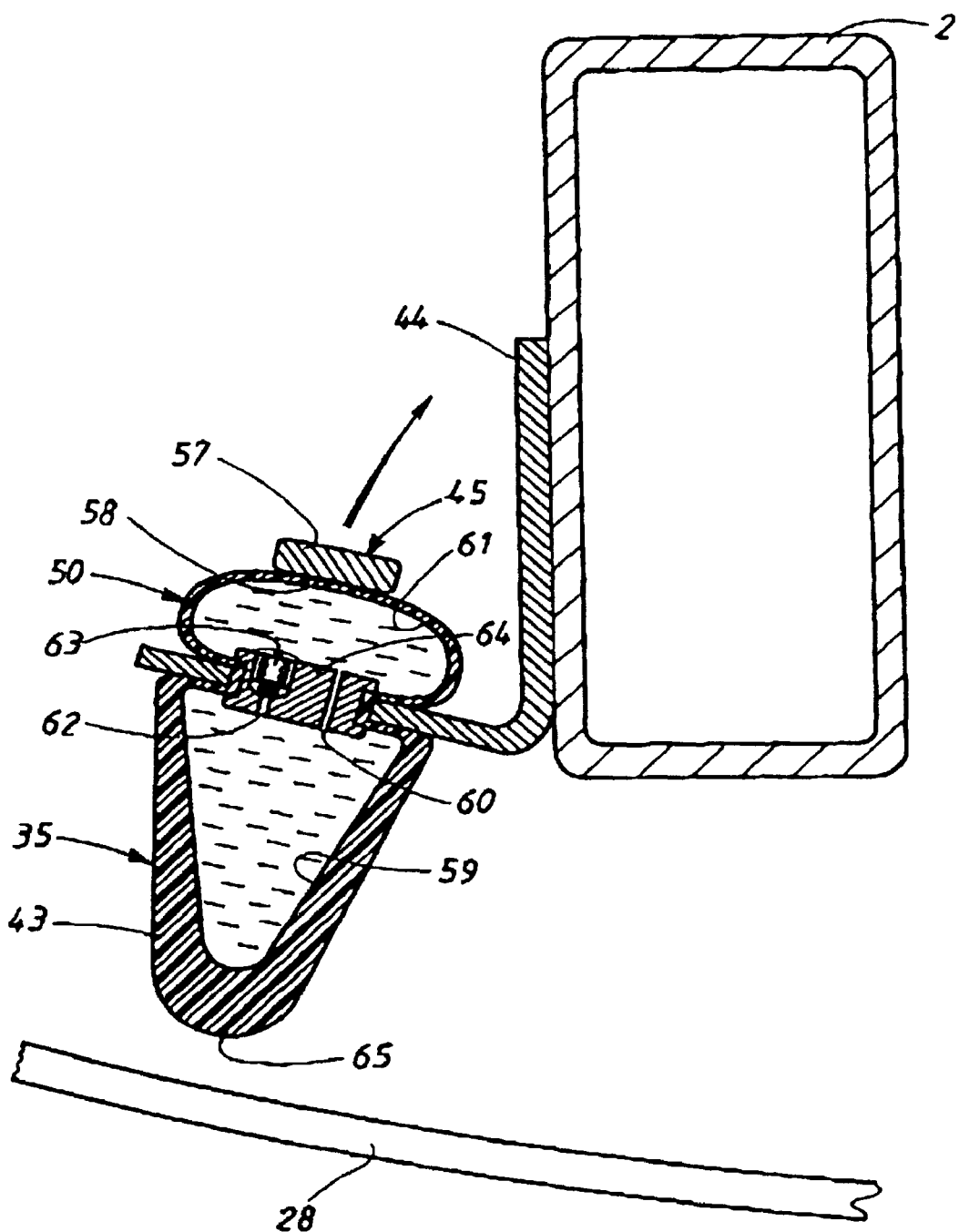
FIG. 13 illustrates an enlarged cross-sectional view of an upper deflection limiting device comprising an engaging means and an actuating device in an unloaded condition.

The design and the function of the engaging means 43 of the upper deflection limiting means 35 and the respective actuating means 50 will now be described with reference to FIGS. 13 and 14. According to the preferred embodiment shown, the engaging means 43 comprises a first liquid- or gas-filled hydraulic chamber 59, which communicates with a second liquid- or gas-filled hydraulic chamber 61 arranged in the actuating means 50 by means of an intermediate conduit 60. In this manner an upper deflection limiting means 35 and actuating means 50 with an integrated hydraulic function is obtained. As seen in FIG. 13, the actuating means 50 is placed immediately adjacent the engaging means 43.

The first hydraulic chamber 59 comprises an elastically compressible bladder, made from rubber or material with rubber-like properties, such as a plastic material. The second hydraulic chamber 61 comprises an elastically expandable bladder made from the same or a similar material as the first hydraulic chamber 59. As seen in FIGS. 13 and 14, the first and second hydraulic chambers 59, 60 are integrated into a contiguous bladder subdivided into two sections.

A further second intermediate conduit 62 connects the first and second hydraulic chambers 59, 61, wherein the conduit 62 is provided with a non-return valve 63 preventing the flow of liquid or gas from the second hydraulic chamber 61 to the first hydraulic chamber 59. The hydraulic chambers are preferably filled with hydraulic oil, but other fluids such as water or air may be used for this purpose. Both the conduits 60, 62 as well as the non-return valve 63 are integrated in an intermediate cylindrical section 64, preferably made from a metallic material.

FIG. 13 illustrates the engaging means 43 in an unloaded condition, where the leaf spring 28 has yet to contact the body of the engaging means 43 of the upper deflection limiting device 35. As illustrated, the engaging means 43 has a rounded conical shape in its unloaded condition, where the rounded tip 65 of the cone is directed towards the leaf spring 28. The hydraulic chamber 61 of the actuating means 50, which has not yet been expanded, has its upper surface in contact with the actuating surface 58 on the connecting element 57 of the lever 45.

Figure 14:
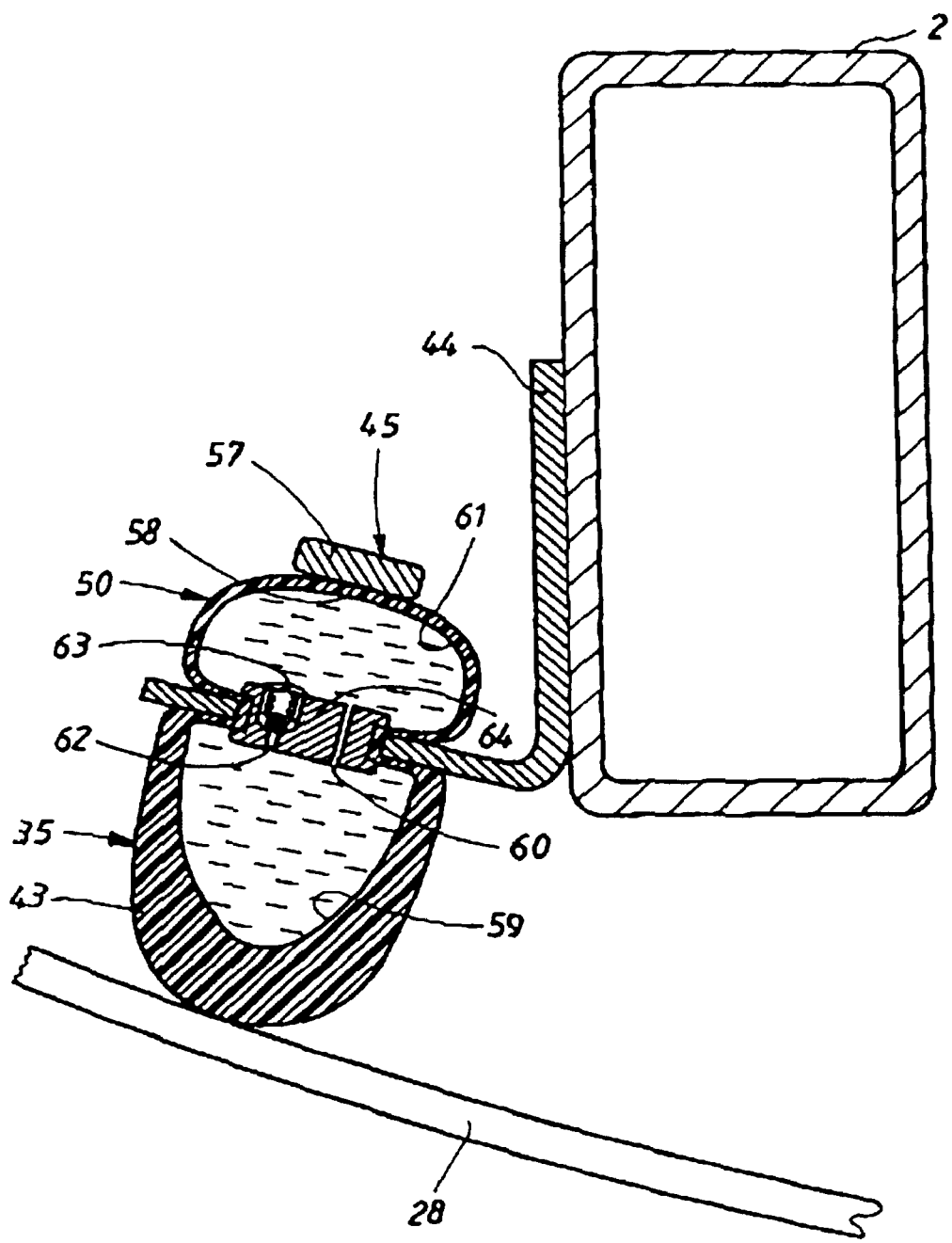
FIG. 14 illustrates a cross-sectional view according to FIG. 13, but with an engaging means and an actuating device in a loaded condition.

In FIG. 14 the leaf spring 28 has contacted the engaging means 43 due to, e.g., aggressive driving or a heavy load. The engaging means 43 is compressed and assumes a rounder, compressed shape. Hydraulic fluid flows from the first hydraulic chamber 59 in the engaging means 43 through both the first and the second conduits 60, 72 and into the second hydraulic chamber 61. The second hydraulic chamber 61 then expands and acts against the actuating surface 58 so that the connecting element 57 of the lever 45 is displaced upwardly, e.g., the distance A shown in FIG. 4. As described above, the lever 45 pivots around its suspension axis 32, whereby the supporting element 48 with its inner attachment point 41 is displaced downwards distance B and outwards distance C causing, for example, an increase of the stiffness of the spring. When springing back, the leaf spring instead acts on the supporting element 48 of the lever 45 with an upwardly directed force component. This causes the lever 45 to be pivoted in the opposite direction, whereby the actuating surface 58 on the connecting element 57 pushes on the hydraulic chamber 61 of the actuating means 50 in a downward direction. This causes hydraulic fluid to flow back into the first hydraulic chamber 59 of the engaging means 43. Flow will only take place through the first intermediate conduit 60 as the non-return valve 63 is closed and blocks the second intermediate channel 62. By using an hydraulic oil or another fluid as a hydraulic fluid and adapting the cross-sectional area of the first conduit 60 to form a relatively narrow passage, an effective damping is achieved as the leaf spring 28 springs back. The degree of damping can be varied simply by choosing a desired cross-sectional area for the first conduit 60.

The engaging means 43 and the actuating means 50 can be made in several different ways within the scope of the invention. Four such embodiments will be described below, with reference to the FIGS. 15–18.

Figure 15:
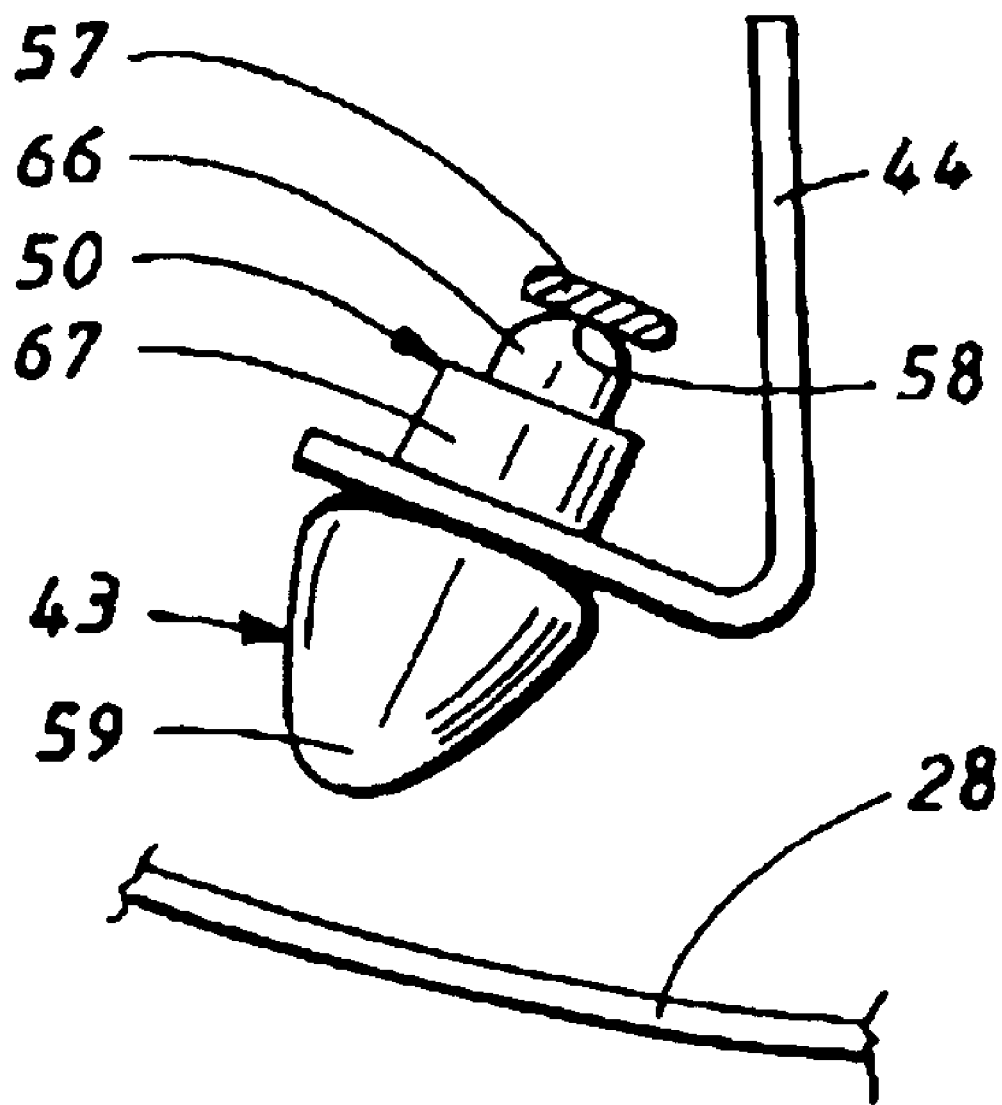
FIG. 15 illustrates a front plane view of a first alternative embodiment of the invention, wherein the actuating means comprises a hydraulic piston arranged to cooperate with the hydraulic chamber.

FIG. 15 illustrates a first alternative embodiment of the invention, wherein the engaging means 43 comprises a hydraulic piston 66 arranged to cooperate with the hydraulic chamber 59. The piston 66 is slidable in a coaxially arranged cylinder 67 and in contact with the actuating surface 58 of the connecting section 57 on the lever 45.

Figure 16:
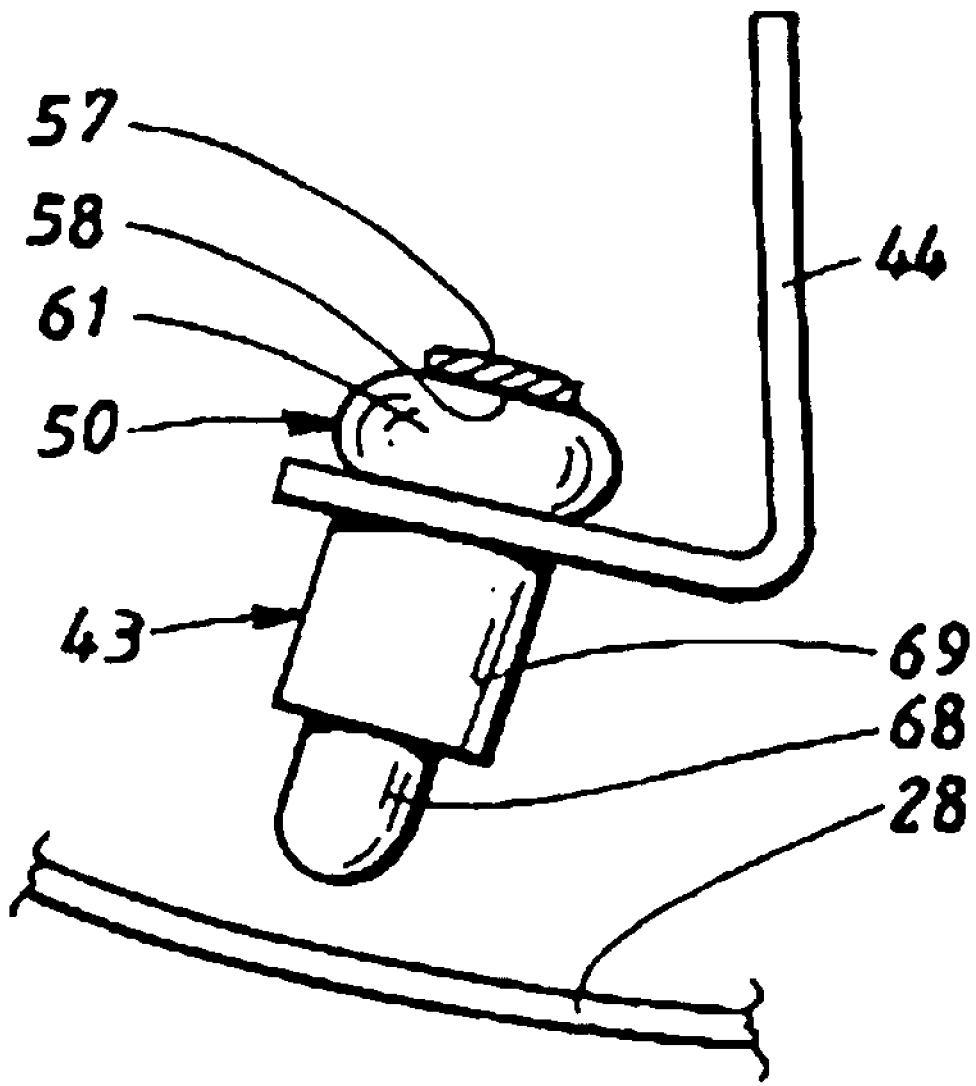
FIG. 16 illustrates a front plane view of a second alternative embodiment of the invention, wherein the engaging means comprises a hydraulic piston and the actuating means comprises a liquid- or gas-filled hydraulic chamber in the form of an elastically expandable bladder.

FIG. 16 illustrates a second alternative embodiment of the invention, wherein the engaging means 43 comprises a hydraulic piston 68 and the actuating means 50 comprises a liquid- or gas-filled hydraulic chamber 50 in the form of an elastically expandable bladder. The piston 68 is slidable in a coaxially arranged cylinder 69 and arranged to be able to act on the leaf spring 28.

Figure 17:
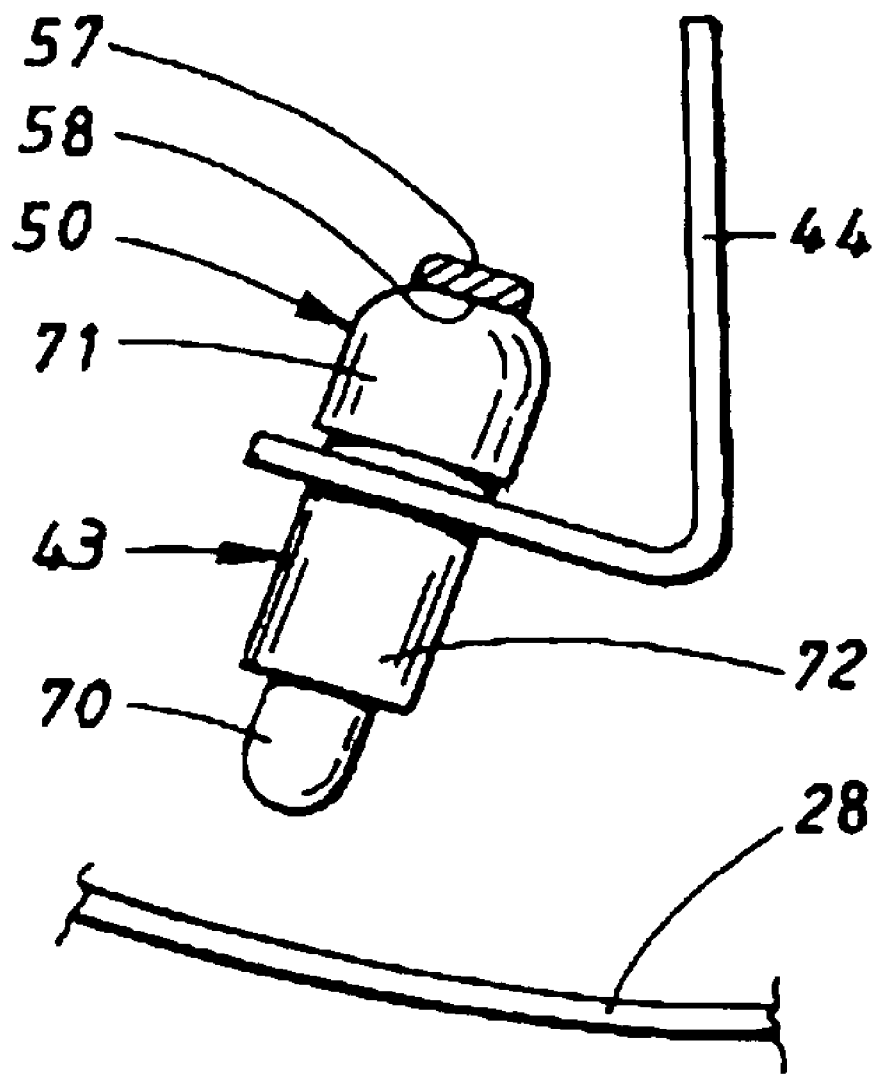
FIG. 17 illustrates a front plane view of a third alternative embodiment of the invention, wherein the engaging means comprises a first hydraulic piston, while the actuating means comprises a second hydraulic piston arranged to cooperate with the first hydraulic piston.

FIG. 17 illustrates a third alternative embodiment of the invention, wherein the engaging means 43 comprises a first hydraulic piston 70 and the actuating means 50 comprises a second hydraulic piston 71 arranged to cooperate with the first hydraulic piston 70. The first hydraulic piston is therefore slidable in a coaxially arranged cylinder 72 and arranged to act on the leaf spring 28, while the second piston is slidably arranged on the outside of the cylinder 72.

Figure 18:
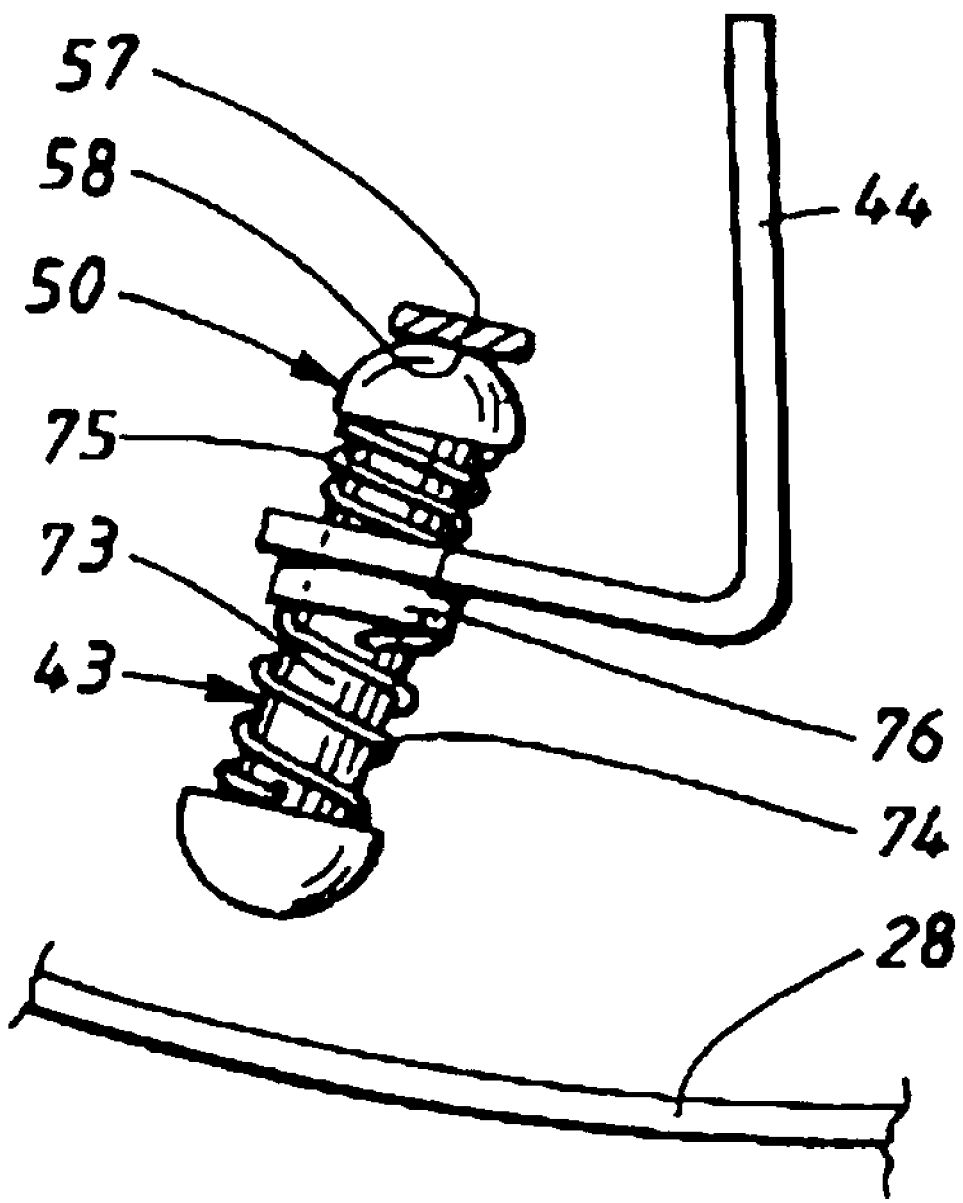
FIG. 18 illustrates a front plane view of a fourth alternative embodiment of the invention, wherein the engaging means is rigidly connected to the actuating means.

Finally, FIG. 18 illustrates a fourth alternative embodiment of the invention, wherein the engaging means 43 is rigidly connected to the actuating means 50 by means of an intermediate rod-shaped part 73. A compressive spring 74 pre-loads the engaging means 43 in a downward direction, while a compressive spring 75 pre-loads the actuating means 50 in an upward direction. The rod-shaped part 73 is slidable through a cylindrical casing 76 in the bracket 44.

Other embodiments of the present invention may be applicable to other wheel suspensions. For example, the suggested solution using movable spring seats 29, 30 in combination with a transverse spring means 28 is not limited for use with crossed linkages 6, 7. Furthermore, the transverse leaf spring 28 may be replaced by some other form of transverse spring means of a different type and cross-section, such as a composite spring made from fiber reinforced plastics.

It should be understood that the invention is not limited to the embodiments described above and in the attached drawings, but may be freely modified within the scope of the subsequent claims.

What is claimed is:

1. A wheel suspension for a vehicle comprising:
   in the longitudinal direction of the vehicle a transverse spring means having a first end section positioned at the left half of the vehicle relative to a vertical longitudinal plane through the center of the vehicle, and a second end section positioned at the right half of the vehicle, wherein each of the end sections are attached, directly or indirectly, to a wheel carrier carrying the left and right wheels of the vehicle, respectively, at an outer attachment point in relation to the longitudinal plane, and where said spring means is attached to the vehicle via a spring seat at an inner attachment point on either side of the plane; and an upper deflection limiting device having engaging means for engaging said spring means, attached to the left and right half of the vehicle respectively, wherein said spring seats each comprise a lever having:
   a central suspension section wherein the lever is pivotable relative to the vehicle around a suspension axis arranged in a substantially longitudinal direction of the vehicle;
   an inner end section placed below and, relative to the longitudinal plane, inside said central suspension section, wherein said inner end section is provided with a supporting element in contact with said spring means in said inner attachment point, which supporting element is slidable along said spring means in the transverse direction of the vehicle as a function of the rotation of said lever around said suspension axis; and
   an outer end section placed outside the central suspension section, whereby said spring means contacts said engaging means of said deflection limiting device, and an actuating device connected to said engaging means is arranged to mechanically act on the outer end section in such a way that said lever is pivoted around said suspension axis, whereby said supporting element, as well as said inner attachment point, are displaced downwards and outwards towards said outer attachment point of said spring means.

2. A wheel suspension according to claim 1 wherein said outer end section is provided with an actuation surface arranged for contacting the actuating device.

3. A wheel suspension according to claim 1 wherein said actuating device is preferably placed immediately adjacent said engaging means.

4. A wheel suspension according to claim 1 wherein said spring means comprises a leaf spring.

5. A wheel suspension according to claim 1 wherein said engaging means comprises a first liquid- or gas-filled hydraulic chamber.

6. A wheel suspension according to claim 5 wherein said first hydraulic chamber comprises an elastically compressible bladder.

7. A wheel suspension according to claim 5 wherein said first liquid- or gas-filled hydraulic chamber communicates with a second hydraulic chamber arranged in the actuating device, through a first conduit.

8. A wheel suspension according to claim 7 wherein said second hydraulic chamber comprises an elastically expandable bladder.

9. A wheel suspension according to claim 5 wherein a second intermediate conduit connects said first and second hydraulic chambers, wherein said second conduit is provided with a non-return valve preventing liquid or gas from flowing from said second hydraulic chamber to said first hydraulic chamber.

10. A wheel suspension according to claim 5, wherein said actuating device comprises a hydraulic piston arranged to co-operate with said hydraulic chambers.

11. A wheel suspension according to claim 1, wherein said engaging means comprises a hydraulic piston, and said actuating device comprises a liquid- or gas-filled hydraulic chamber in the form of an elastically expandable bladder arranged to co-operate with said hydraulic piston.

12. A wheel suspension according to claim 1 wherein said engaging means comprises a first hydraulic piston, and said actuating device comprises a second hydraulic piston arranged to co-operate with said first hydraulic piston.

13. A wheel suspension according to claim 1 wherein said engaging means is rigidly connected to said actuating device.

14. A wheel suspension according to claim 13 wherein said engaging means is spring loaded in a downward direction by means of a compressive spring.

15. A wheel suspension according to claim 14 wherein said actuating device is spring loaded in an upward direction by means of a compressive spring.

16. A wheel suspension according to claim 1 wherein said end sections of said spring means are connected to shock absorbers mounted on the vehicle.

17. A wheel suspension for a vehicle comprising:

in the longitudinal direction of the vehicle a leaf spring having a first end section positioned at the left half of the vehicle relative to a vertical longitudinal plane through the center of the vehicle, and a second end section positioned at the right half of the vehicle, wherein each of the end sections are attached, directly or indirectly, to a wheel carrier carrying the left and right wheels of the vehicle, respectively, at an outer attachment point in relation to the longitudinal plane, and where said spring is attached to the vehicle via a spring seat at an inner attachment point on either side of the plane; and an upper deflection limiting device having a damper for engaging said spring, attached to the left and right half of the vehicle respectively, wherein said spring seats each comprise a lever having:

a central suspension section wherein the lever is pivotable relative to the vehicle around a suspension axis arranged in a substantially longitudinal direction of the vehicle;

an inner end section placed below and, relative to the longitudinal plane, inside said central suspension section, wherein said inner end section is provided with a supporting element in contact with said spring in said inner attachment point, which supporting element is slidable along said spring in the transverse direction of the vehicle as a function of the rotation of said lever around said suspension axis; and an outer end section placed outside the central suspension section, whereby said spring contacts said damper of said deflection limiting device, and an actuating device connected to said damper is arranged to mechanically act on the outer end section in such a way that said lever is pivoted around said suspension axis, whereby said supporting element, as well as said inner attachment point, are displaced downwards and outwards towards said outer attachment point of said spring.

* * * * *